United States Patent
Moore et al.

(10) Patent No.: US 7,299,042 B2
(45) Date of Patent: Nov. 20, 2007

(54) COMMON SIGNALING METHOD AND APPARATUS

(75) Inventors: Steve Moore, Escondido, CA (US); John Santhoff, Carlsbad, CA (US); Douglas Cummings, Carlsbad, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 0 days.

(21) Appl. No.: 11/115,217

(22) Filed: Apr. 25, 2005

(65) Prior Publication Data

US 2006/0030318 A1 Feb. 9, 2006

Related U.S. Application Data

(60) Provisional application No. 60/592,755, filed on Jul. 30, 2004.

(51) Int. Cl.
*H04Q 7/20* (2006.01)
*H04Q 7/28* (2006.01)

(52) U.S. Cl. .................................. 455/434; 370/329

(58) Field of Classification Search .............. 370/329, 370/330–334, 310–350; 455/41.2–41.3, 455/434, 454, 450–453, 466, 455, 3.05, 418–420, 455/456.4
See application file for complete search history.

(56) References Cited

U.S. PATENT DOCUMENTS

| | | | |
|---|---|---|---|
| 3,648,287 A | 3/1972 | Lind | |
| 3,668,639 A | 6/1972 | Harmuth | |
| 3,678,204 A | 7/1972 | Harmuth | |
| 3,728,632 A | 4/1973 | Ross | |
| 4,641,317 A | 2/1987 | Fullerton | |
| 4,979,186 A | 12/1990 | Fullerton | |
| 5,146,616 A | 9/1992 | Tang et al. | |
| 5,363,108 A | 11/1994 | Fullerton | |
| 5,497,505 A * | 3/1996 | Koohgoli et al. | ........... 455/454 |
| 5,530,701 A * | 6/1996 | Stillman et al. | ......... 455/150.1 |
| 5,551,066 A | 8/1996 | Stillman et al. | |
| 5,677,927 A | 10/1997 | Fullerton et al. | |
| 5,687,169 A | 11/1997 | Fullerton | |
| 5,748,891 A | 5/1998 | Fleming et al. | |

(Continued)

FOREIGN PATENT DOCUMENTS

EP 0 825 794 A2 2/1998

(Continued)

OTHER PUBLICATIONS

Di Wu, Predrag Spasojevic, Ivan Seskar, "Multipath Beamforming UWB Signal Design Based on Ternary Sequences", 40th Annual Allerton Conference, Aug. 26, 2002, WINLAB, Rutgers University, Camden, New Jersey, USA.

(Continued)

*Primary Examiner*—Naghmeh Mehrpour

(57) ABSTRACT

A common signaling method are apparatus are provided. In one embodiment, a method is provided that enables communication in under-utilized radio frequencies by receiving a master beacon, scanning radio frequencies included in the master beacon, and establishing communications using an unoccupied radio frequency from one of the listed radio frequencies. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

2 Claims, 5 Drawing Sheets

U.S. PATENT DOCUMENTS

| | | | |
|---|---|---|---|
| 5,920,278 | A | 7/1999 | Tyler et al. |
| 6,002,708 | A | 12/1999 | Fleming et al. |
| 6,026,125 | A | 2/2000 | Larrick, Jr. et al. |
| 6,031,862 | A | 2/2000 | Fullerton et al. |
| 6,178,217 | B1 | 1/2001 | Defries et al. |
| 6,275,544 | B1 | 8/2001 | Aiello et al. |
| 6,281,784 | B1 | 8/2001 | Redgate et al. |
| 6,505,032 | B1 | 1/2003 | McCorkle et al. |
| 6,539,213 | B1 | 3/2003 | Richards et al. |
| 6,690,741 | B1 | 2/2004 | Larrick, Jr. et al. |
| 6,961,556 | B2 * | 11/2005 | James et al. ................ 455/454 |
| 7,085,306 | B1 * | 8/2006 | Voldman et al. ............ 370/329 |
| 2001/0033610 | A1 | 10/2001 | Chastain |
| 2002/0075972 | A1 | 6/2002 | Richards et al. |
| 2002/0076193 | A1 | 6/2002 | Melick et al. |
| 2002/0197910 | A1 | 12/2002 | Kerr, Jr. et al. |
| 2004/0008729 | A1 | 1/2004 | Rogerson et al. |
| 2004/0013127 | A1 | 1/2004 | Shvodian |
| 2004/0028012 | A1 | 2/2004 | Walker et al. |

FOREIGN PATENT DOCUMENTS

| | | |
|---|---|---|
| WO | WO 98/27670 | 6/1998 |
| WO | WO 01/39451 A1 | 5/2001 |
| WO | WO 01/93434 A2 | 12/2001 |
| WO | WO 02/31986 A2 | 4/2002 |

OTHER PUBLICATIONS

Henning F. Harmuth, "Applications of Walsh functions in communications", IEEE Spectrum, Nov. 1969, pp. 82-91, USA.

Robert Fleming, Cherie Kushner, "Integrated, Low-Power, Ultra-Wideband Transeivers for Distributed Position Location and Communication", Semi-Annual Technical Report Contract J-BFI-94-058, Aether Wire & Location, Inc. Jul. 1995, Nicasio, CA, USA.

Robert Fleming, Cherie Kushner, "Low-Power, Miniature, Distributed Position Location and Communication Device Using Ultra-Wideband, Nonsinusoidal Communication Technology", Semi-Annual Technical Report Contract J-BFI-94-058, Aether Wire & Location, Inc. Jul. 1995, Nicasio, CA, USA.

Fernando Ramirez-Mireles, Robert A. Scholtz, "N-Orthogonal Time-Shift-Modulted Codes for Impulse Radio", Report from Joint Services Electronics Program Contact F 49620-94-0022, CTMC 1997, IEEE Wireless 98, Jul. 1998, USA.

Fernando Ramirez-Mireles, "On Performance of Ultra Wideband Signals in Gaussian Noise and Dense Multipath", Paper 99C265, Accepted for Publication in the IEEE Transactions on Vehicular Technology, USC Ultralab, USA, no date listed.

Robert A. Scholtz, P. Vijay Kumar, Carlos J. Corrada-Bravo, "Signal Design for Ultra-Wideband Radio", Department of ELectrical Engineering, University of Southern California, Los Angeles, CA, USA, no date listed.

Moe Z. Win, Zoran A. Kostic, "Impact of Spreading Bandwidth on Rake Reception in Dense Multipath Channels", IEEE Journal on Selected Areas on Communications, vol. 17, No. 10, pp. 1794-1806, Oct. 1999, USA.

Moe Z. Win, George Chrisikos, Nelson R. Sollenberger, "Performance of Rake Reception in Dense Multipath Channels: Implications of Spreading Bandwidth and Selection Diversity Order", IEEE Journal on Selected Areas on Communications, vol. 18, No. 8, pp. 1516-1525, Aug. 2000, USA.

Henning F. Harmuth, "Frequency-Sharing and Spread-Spectrum Transmission with Large Relative Bandwidth", IEEE Transactions on Electromagnetic Compatibility, vol. EMC-20, No. 1, Feb. 1978, USA.

Multispectral Solutions, Inc., Revision of Part 15 of the Commission's Rules RegardingUltra-Wideband Transmission Systems Sep. 12, 2000.

Anna Scaglione, "Differetial Direct Sequence Spread Spectrum for Ultra-Wideband Low Power Wireless Microsystems", University of New Mexico, Dept. of EECE, Alburquerque, NM, USA, no date listed.

David Wright & Ryan Winfield-Woodings, An efficient 2.4—GHz wireless net for less, EE Times, Oct. 31, 2003, 3 pages.

Siemens & Texas Instruments, Generalised Hierarchical Golay Sequence for PSC with low complexity correlation using pruned efficient Golay correlators, 6 pages, no dated listed.

Anuj Batra et al. & Texas Instruments et al., Multi-band OFDM Physical Layer Proposal for IEEE 802.15 Task Group 3a, Jul. 21, 2003, 71 pages.

David Cypher, Coexistence, Interoperability and Other Terms, Sep. 2000, 18 pages, no month listed.

Federal Communications Commission, Spectrum Policy Task Force, Technology Advisory Council (TAC) Briefing, Dec. 2002, 21 pages.

Federal Communications Commission, Comments of Time Domain Corporation, In the Matter of Report of the Spectrum Policy Task Force Docket 02-135, Jan. 23, 2003, 5 pages.

William D Horne, Adaptive Spectrum Access: Using the FUll Spectrum Space, 15 pages, no date listed.

Pentek, Inc., MITRE Designs an Adaptive Spectrum Radio Platform, The Pentek Pipeline, Spring 2003, 4 pages, vol. 12, No. 1, no month listed.

William D Horne & Peter Weed, Adaptive Spectrum Radio: A Feasibility Platform On The Path To Dynamic Spectrum Access, International Symposium On Advanced Radio Technologies, Mar. 5, 2003, 1 page.

Ayal Shoval, W Martin Snelgrove & David A Johns, A 100 Mb/s BiCMOS Adaptive Pulse-Shaping Filter, IEEE Journal On Selected Areas in Communications, Dec. 2003, 11 pages, vol. 13, No. 9.

Federal Communications Commission, Comments of Nickolaus E. Leggett N3NL Amateur Radio Operator, In the Matter of Facilitating Opportunities for Flexible, Efficient, and Reliable Spectrum Use Employing Cognitive Radio Technologies (ET Docket No. 03-108). Authorization and Use of Software Defined Radios (ET Docket No. 00-47 Terminated), Jan. 9, 2004, 7 pages.

Kathleen Q. Abernathy, My Vision of the Future of American Spectrum Policy, Remarks of FCC Commissioner Before the Cato Institute's Sixth Annual Technology & Society Conference Washington, D.C., Nov. 14, 2002, 8 pages.

Dr. Daniel Schaefer & Mr. Steve Cox, Adaptive Spectrum Utilization with Software Defined Radio, Oct. 2, 2002, 23 pages.

Federal Communications Commission, Notice of Proposed Rule Making, In the Matter of Authorization and Use of Software Defined Radios (ET Docket No. 00-47), Dec. 8, 2000, 23 pages.

Federal Communications Commission, Notice of Proposed Rule Making and Order, In the Matter of Facilitating Opportunities for Flexible, Efficient, and Reliable Spectrum Use Employing Cognitive Radio Technologies (ET Docket No. 03-108) & Authorization and Use of Software Defined Radios (ET Docket No. 00-47 Terminated), Dec. 30, 2003, 53 pages.

Federal Communications Commission, Notice of Inquiry And Notice of Proposed Rule Making and Order, In the Matter of Establishment of an Interference Temperature Metric to Quantify and Manage Interference and to Expand Available Unlicensed Operation in Certain Fixed, mobile and Satillite Frequency Bands (ET Docket No. 03-237), Nov. 28, 2003, 31 pages.

United States Code of Federal Regulations, Title 47, Chapter 1, Part 15, Section 15.5, Paragraph (b), 1 pg. no date listed.

Evan Kwerel & John Williams, A Proposal for Rapid Transition to Market Allocation of Spectrum, OPP Working Paper Series, Fedreal Communications Commisions Office of PLans and Policy, Nov. 2002, 62 pages.

Kenneth R. Carter, Ahmed Lahjouji & Neal McNeil, Summary of OSP Working Paper 39, Unlicensed and Unshackled: A joint OSP and OET White Paper on Unlicensed Spectrum Devices and Their Regulatory Issues, May 2003, 2 pages.

Andrew Lippman & David P. Redd, Viral Communications, MIT Media Laboratory Research, May 19th, 2003 Draft, 15 pages.

Navin Sabharwal, 802.11 vs. Bluetooth Revisited, Home Toys Article, Oct. 2002, 3 pages.

C. E. Shannon, A mathematical theory of communication, Bell Systems Technical Journal, XXVII(3 and 4):379-423 and 623-656, July (part 1) and October (part 2) 1948, 55 pages.

Oren Eliezer & Matthew Shoemake, Bluetooth and Wi-Fi coexistence schemes strive to avoid chaos, RF Design Article, Nov. 1, 2001, 6 pages.

Bill Krenik & Mike Yonker, Pressure Mounts in Next-Gen Mobile Phone Designs, Comms Design, Apr. 16, 2004, 5 pages.

Telecommunications Industry Association, TIA/EIA/IS-95-A: Mobile Station-Base Station Compatibility Standard for Dual-Mode Wideband Spread Spectrum Cellular System + Telecommunications System Bulletin: Support for 14.4 kbps Data Rate and PCS Interaction for Wideband Spread Spectrum Cellular Systems, Feb. 27, 1996, pp. 1-5, 1-11, 6-220, 7-1, 7-4, 7-25.

IEEE-USA Board of Directors, Improving Spectrum Usage Through Cognitive Radio Technology, IEEE Position Paper, Nov. 13, 2003, 4 pages.

Piyush Gupta & P. R. Kumar, The capacity of wireless networks, IEEE Transactions on Information Theory, vol. IT-46, pp. 388-404, Mar. 2000, 48 pages.

* cited by examiner

COMMON SIGNALING METHOD AND APPARATUS

Priority is claimed to U.S. Provisional Application Ser. No. 60/592,755 filed Jul. 30, 2004, entitled "Common Signaling Method and Apparatus," which is referred to and incorporated herein in its entirety by this reference.

FIELD OF THE INVENTION

The present invention relates to the field of wireless communications. More particularly the present invention describes a common communication method for communication devices.

1. Background of the Invention

The Information Age is upon us. Access to vast quantities of information through a variety of different communication systems are changing the way people work, entertain themselves, and communicate with each other. Faster, more capable communication technologies are constantly being developed. Additionally, these technologies may have the advantage of more efficient use of spectrum. For the manufacturers and designers of these new technologies, achieving "interoperability" is becoming an increasingly difficult challenge.

Interoperability is the ability for one device to communicate with another device, or to communicate with another network, through which other communication devices may be contacted. However, with the explosion of different communication protocols (i.e., the rules communications equipment use to transfer data), designing true interoperability is not a trivial pursuit.

For example, most wireless communication devices employ conventional "carrier wave," or radio frequency (RF) technology, while other devices use electro-optical technology. Generally, each one of these communication technologies employ their own communication protocol.

Another type of communication technology is ultra-wideband (UWB). UWB technology is fundamentally different from conventional forms of RF technology. UWB may employ a "carrier free" architecture, which does not require the use of high frequency carrier generation hardware; carrier modulation hardware; frequency and phase discrimination hardware or other devices employed in conventional frequency domain communication systems.

Within UWB communications, several different types of technologies and networks, each with their own communication protocols are envisioned. For example, there are Local Area Networks (LANs), Personal Area Networks (PANs), Wireless Personal Area Networks (WPANs), sensor networks and others. Each network may have its own communication protocol.

Therefore, there exists a need for a common communication method for communication devices, which will allow for more efficient use of spectrum, compatibility and coexistence between different networks, and different types of communication devices.

SUMMARY OF THE INVENTION

The present invention provides a common communication method, or protocol for communications using under-utilized radio frequency bands.

In one embodiment, signaling information is communicated in a master beacon signal. A device may scan a number of frequencies until it finds the master beacon signal and the signaling information contained within the master beacon signal. A protocol, or communication method, is provided that enables a communication device to scan for signaling information prior to transmission.

One feature of the present invention is that provides apparatus, systems and methods for communication in broadcast television frequencies, and other under-utilized frequency bands. Under the current regulatory regime, many frequency bands in the broadcast spectrum are under-utilized. One feature of the present invention provides a master beacon that informs adaptive communication devices of radio frequencies that are available for use as a communication channel.

These and other features and advantages of the present invention will be appreciated from review of the following detailed description of the invention, along with the accompanying figures in which like reference numerals refer to like parts throughout.

Figure 1:
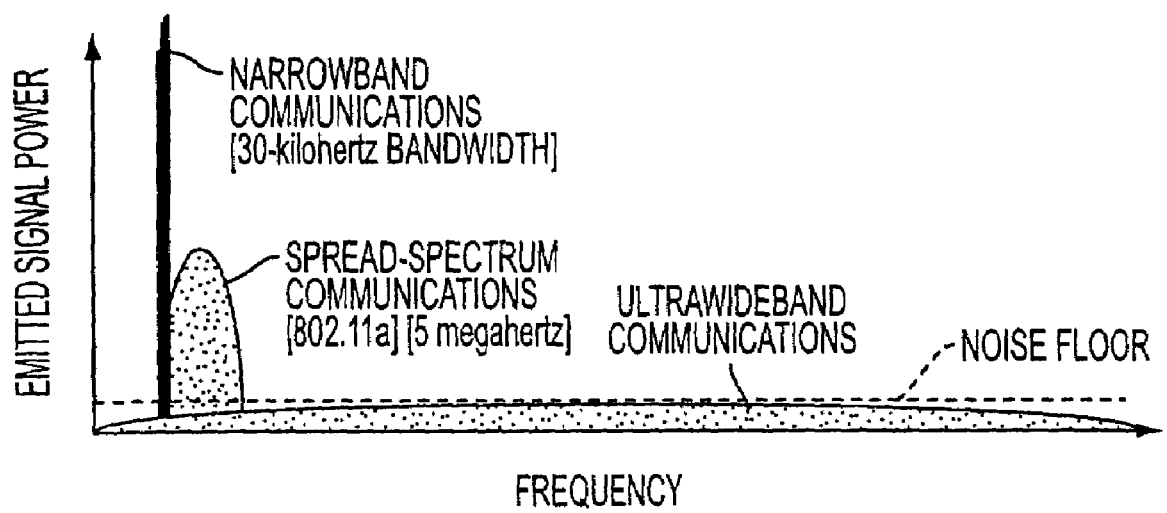
FIG. 1 is an illustration of different communication methods.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

One feature of the present invention is that provides apparatus, systems and methods for communication in broadcast television frequencies, and other under-utilized frequency bands. Under the current regulatory regime, many frequency bands in the broadcast spectrum are under-utilized. One feature of the present invention provides a master beacon that informs adaptive communication devices of radio frequencies that are available for use as a communication channel. A number of different communications technologies may be used to practice the invention. These communications technologies may include conventional carrier wave based technologies and ultra-wideband (UWB) based technologies.

An example of a conventional carrier wave communication technology is illustrated in FIG. 1. IEEE 802.11a is a wireless local area network (LAN) protocol, which transmits a sinusoidal radio frequency signal at a 5 GHz center frequency, with a radio frequency spread of about 5 MHz. As defined herein, a carrier wave is an electromagnetic wave of a specified frequency and amplitude that is emitted by a radio transmitter in order to carry information. The 802.11 protocol is an example of a carrier wave communication technology. The carrier wave comprises a substantially continuous sinusoidal waveform having a specific narrow radio frequency (5 MHz) that has a duration that may range from seconds to minutes.

Figure 2:
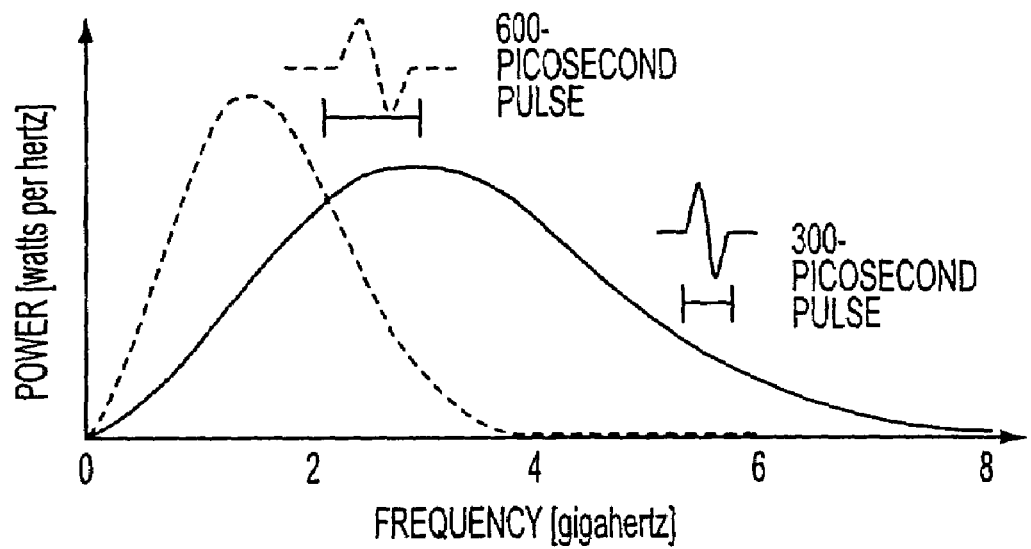
FIG. 2 is an illustration of two ultra-wideband pulses.

Referring to FIGS. 1 and 2, impulse-UWB communication employs discrete pulses of electromagnetic energy that are emitted at, for example, nanosecond or picosecond intervals (generally tens of picoseconds to a few nanoseconds in duration). For this reason, this type of ultra-wideband is often called "impulse radio." That is, the UWB pulses may be transmitted without modulation onto a sine wave, or a sinusoidal carrier, in contrast with conventional carrier wave communication technology. This type of UWB generally requires neither an assigned frequency nor a power amplifier.

In contrast, an ultra-wideband (UWB) pulse may have a 2.0 GHz center frequency, with a frequency spread of approximately 4 GHz, as shown in FIG. 2, which illustrates two typical UWB pulses. FIG. 2 illustrates that the shorter the UWB pulse in time, the broader the spread of its frequency spectrum. This is because bandwidth is inversely proportional to the time duration of the pulse. A 600-picosecond UWB pulse can have about a 1.8 GHz center frequency, with a frequency spread of approximately 1.6 GHz and a 300-picosecond UWB pulse can have about a 3 GHz center frequency, with a frequency spread of approximately 3.3 GHz. Thus, UWB pulses generally do not operate within a specific frequency, as shown in FIG. 1. Either of the pulses shown in FIG. 2 may be frequency shifted, for example, by using heterodyning, to have essentially the same bandwidth but centered at any desired frequency. And because UWB pulses are spread across an extremely wide frequency range, UWB communication systems allow communications at very high data rates, such as 100 megabits per second or greater.

Also, because the UWB pulses are spread across an extremely wide frequency range, the power sampled in, for example, a one megahertz bandwidth, is very low. For example, UWB pulses of one nano-second duration and one-milliwatt average power (0 dBm) spreads the power over the entire one-gigahertz frequency band occupied by the pulse. The resulting power density is thus 1 milliwatt divided by the 1,000 MHz pulse bandwidth, or 0.001 milliwatt per megahertz (−30 dBm/MHz). This is below the signal level most conventional communication systems and therefore does not interfere with the demodulation and recovery of conventional communication signals.

Generally, in the case of wireless communications, a multiplicity of UWB pulses may be transmitted at relatively low power density (milliwatts per megahertz). However, an alternative UWB communication system may transmit at a higher power density. For example, UWB pulses may be transmitted between 30 dBm to −50 dBm.

UWB pulses, however, transmitted through many wire media will not interfere with wireless radio frequency transmissions. Therefore, the power (sampled at a single frequency) of UWB pulses transmitted though wire media may range from about +30 dBm to about −140 dBm.

Several different methods of ultra-wideband (UWB) communications have been proposed. For wireless UWB communications in the United States, all of these methods must meet the constraints recently established by the Federal Communications Commission (FCC) in their Report and Order issued Apr. 22, 2002 (ET Docket 98-153). Currently, the FCC is allowing limited UWB communications, but as UWB systems are deployed, and additional experience with this new technology is gained, the FCC may expand the use of UWB communication technology.

The April 22 Report and Order requires that UWB pulses, or signals occupy greater than 20% fractional bandwidth or 500 megahertz, whichever is smaller. Fractional bandwidth is defined as 2 times the difference between the high and low 10 dB cutoff frequencies divided by the sum of the high and low 10 dB cutoff frequencies. Specifically, the fractional bandwidth equation is:

$$\text{Fractional Bandwidth} = 2\frac{f_h - f_l}{f_h + f_l}$$

where $f_h$ is the high 10 dB cutoff frequency, and $f_l$ is the low 10 dB cutoff frequency.

Figure 3:
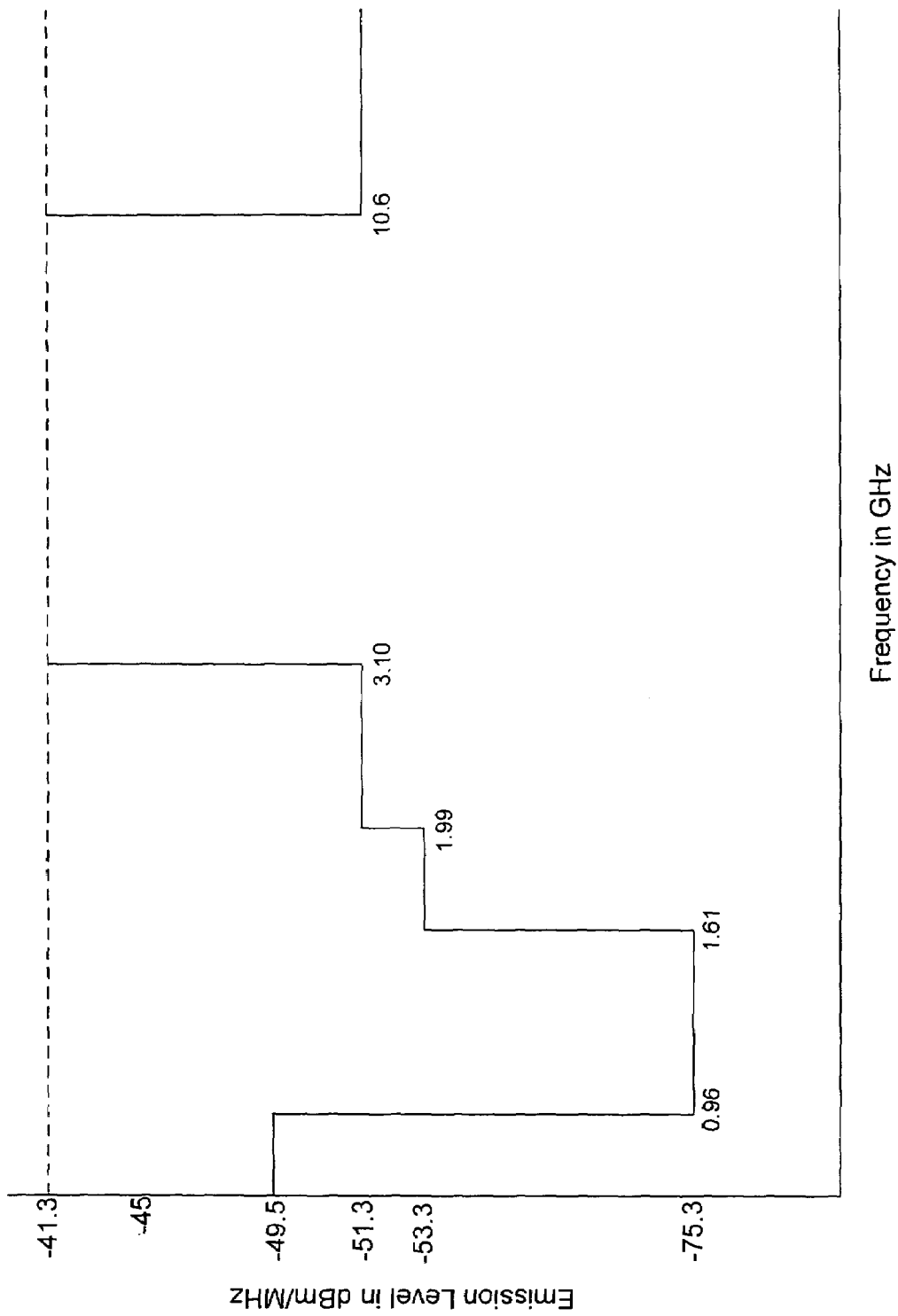
FIG. 3 is a chart of ultra-wideband emission limits as established by the Federal Communications Commission on Apr. 22, 2002.

Stated differently, fractional bandwidth is the percentage of a signal's center frequency that the signal occupies. For example, a signal having a center frequency of 10 MHz, and a bandwidth of 2 MHz (i.e., from 9 to 11 MHz), has a 20% fractional bandwidth. That is, center frequency, $f_c=(f_h+f_l)/2$ FIG. 3 illustrates the ultra-wideband emission limits for indoor systems mandated by the April 22 Report and Order. The Report and Order constrains UWB communications to the frequency spectrum between 3.1 GHz and 10.6 GHz, with intentional emissions to not exceed −41.3 dBm/MHz. The report and order also established emission limits for hand held UWB systems, vehicular radar systems, medical imaging systems, surveillance systems, through-wall imaging systems, ground penetrating radar and other UWB systems. It will be appreciated that the invention described herein may be employed indoors, and/or outdoors, and may be fixed, and/or mobile.

Communication standards committees associated with the International Institute of Electrical and Electronics Engineers (IEEE) are considering a number of ultra-wideband (UWB) wireless communication methods that meet the constraints established by the FCC. One UWB communication method may transmit UWB pulses that occupy 500 MHz bands within the 7.5 GHz FCC allocation (from 3.1 GHz to 10.6 GHz). In one embodiment of this communication method, UWB pulses have about a 2-nanosecond duration, which corresponds to about a 500 MHz bandwidth. The center frequency of the UWB pulses can be varied to place them wherever desired within the 7.5 GHz allocation. In another embodiment of this communication method, an Inverse Fast Fourier Transform (IFFT) is performed on parallel data to produce 122 carriers, each approximately 4.125 MHz wide. In this embodiment, also known as Orthogonal Frequency Division Multiplexing (OFDM), the resultant UWB pulse, or signal is approximately 506 MHz wide, and has approximately 242-nanosecond duration. It meets the FCC rules for UWB communications because it is an aggregation of many relatively narrow band carriers rather than because of the duration of each pulse.

Another UWB communication method being evaluated by the IEEE standards committees comprises transmitting discrete UWB pulses that occupy greater than 500 MHz of frequency spectrum. For example, in one embodiment of this communication method, UWB pulse durations may vary from 2 nanoseconds, which occupies about 500 MHz, to about 133 picoseconds, which occupies about 7.5 GHz of bandwidth. That is, a single UWB pulse may occupy substantially all of the entire allocation for communications (from 3.1 GHz to 10.6 GHz).

Yet another UWB communication method being evaluated by the IEEE standards committees comprises transmitting a sequence of pulses that may be approximately 0.7 nanoseconds or less in duration, and at a chipping rate of approximately 1.4 giga pulses per second. The pulses are modulated using a Direct-Sequence modulation technique, and is called DS-UWB. Operation in two bands is contemplated, with one band is centered near 4 GHz with a 1.4 GHz wide signal, while the second band is centered near 8 GHz, with a 2.8 GHz wide UWB signal. Operation may occur at either or both of the UWB bands. Data rates between about 28 Megabits/second to as much as 1,320 Megabits/second are contemplated.

Another method of UWB communications comprises transmitting a modulated continuous carrier wave where the frequency occupied by the transmitted signal occupies more than the required 20 percent fractional bandwidth. In this method the continuous carrier wave may be modulated in a time period that creates the frequency band occupancy. For example, if a 4 GHz carrier is modulated using binary phase shift keying (BPSK) with data time periods of 750 picoseconds, the resultant signal may occupy 1.3 GHz of bandwidth around a center frequency of 4 GHz. In this example, the fractional bandwidth is approximately 32.5%. This signal would be considered UWB under the FCC regulation stated above.

Thus, described above are four different methods of ultra-wideband (UWB) communication. It will be appreciated that the present invention may be employed by any of the above-described UWB methods, or others yet to be developed.

Regardless of what type of communication method or technology is employed, the radio frequency (RF) or frequencies that a device may use to communicate are becoming more and more crowded. In response to increasing consumer demand for wireless communication, the FCC has proposed that communication devices may operate (i.e., use radio frequencies) in broadcast television frequencies that are not being used to transmit TV signals.

One feature of the present invention is that provides apparatus, systems and methods for communication in broadcast television frequencies, and other under-utilized frequency bands. Under the current regulatory regime, many frequency bands in the broadcast spectrum are under-utilized. Generally, a broadcast television transmission is in the tens of kilo-watts, with some stations exceeding a hundred kilo-watts of transmitted power. Thus, the transmitted signal can travel for tens, and sometimes a hundred or more miles. To avoid interference between two, or more TV broadcasts at the same frequency, each carrying different viewing content, the FCC partitions use of specific radio frequency (RF) bands to specific geographic regions. Therefore, each geographic area has RF bands that are not used. There are typically a number of television channels in a given geographic area that are not used, because transmission may cause interference to co-channel (i.e. same RF band) or adjacent channel stations.

For example, the current regulations for digital television allotments specify minimum separations between co-channel stations ranging from 196.3 to 273.6 kilometers. The digital television frequency bands in the United States are generally from 54 MHz up to 800 MHz. The frequency bands allocated differ from country to country and may include frequencies from 50 MHz up to approximately 1 GHz. These bands are typically discontinuous in that a number of bands within these ranges are not used for broadcast television. For example, the FM frequency band, in the United States extends from 88 MHz to approximately 108 MHz, with aircraft navigation frequencies extending from approximately 108 MHz up to approximately 120 MHz.

One embodiment of the present invention provides a protocol, or communication method designed to facilitate wireless communication in these under-utilized frequency bands. It is well known that the lower radio frequency (RF) bands are more suitable for electromagnetic wave propagation. Propagation is generally modeled as proportional to the inverse of the square of the frequency. Therefore, all other considerations being equal, the higher the frequency band, the shorter the propagation distance. Most current unlicensed communications devices in the United States operate in the 2.4 GHz frequency band, these include devices such as IEEE 802.11b/g (WiFi), BLUETOOTH, an some wireless phones. Another band of interest for unlicensed devices is the 5 GHz band where 802.11a devices operate. As discussed above, ultra-wideband (UWB) is another unlicensed device technology. Currently, UWB communication devices are authorized in the 3.1 to 10.6 GHz frequency band but are limited to −41.25 dBm measured in a MHz. This technology appears to be suitable for Wireless Personal Area Networks (WPAN) and some Wireless Local Area Networks (WLAN) applications. One embodiment of the present invention provides protocols and methods for operation of unlicensed devices in the television broadcast spectrum, which occupies a lower frequency than the above-described frequencies.

In one embodiment of the present invention, a master beacon signal may be broadcast from an AM or FM radio station or alternatively may be broadcast by a television station. The master beacon signal may be: a control signal broadcast by a digital television station; information transmitted during the vertical blanking interval of an analog television station; sub-carrier data transmitted from an AM or an FM radio station; or a master beacon signal may be transmitted by a cellular provider in the 800-900 MHz frequency band. The master beacon may include information about which frequency bands are available within the local geographical region. Alternatively, the master beacon may additionally provide transmit power limits, and priority information, or access for police, fire and other priority services and users.

Figure 4:
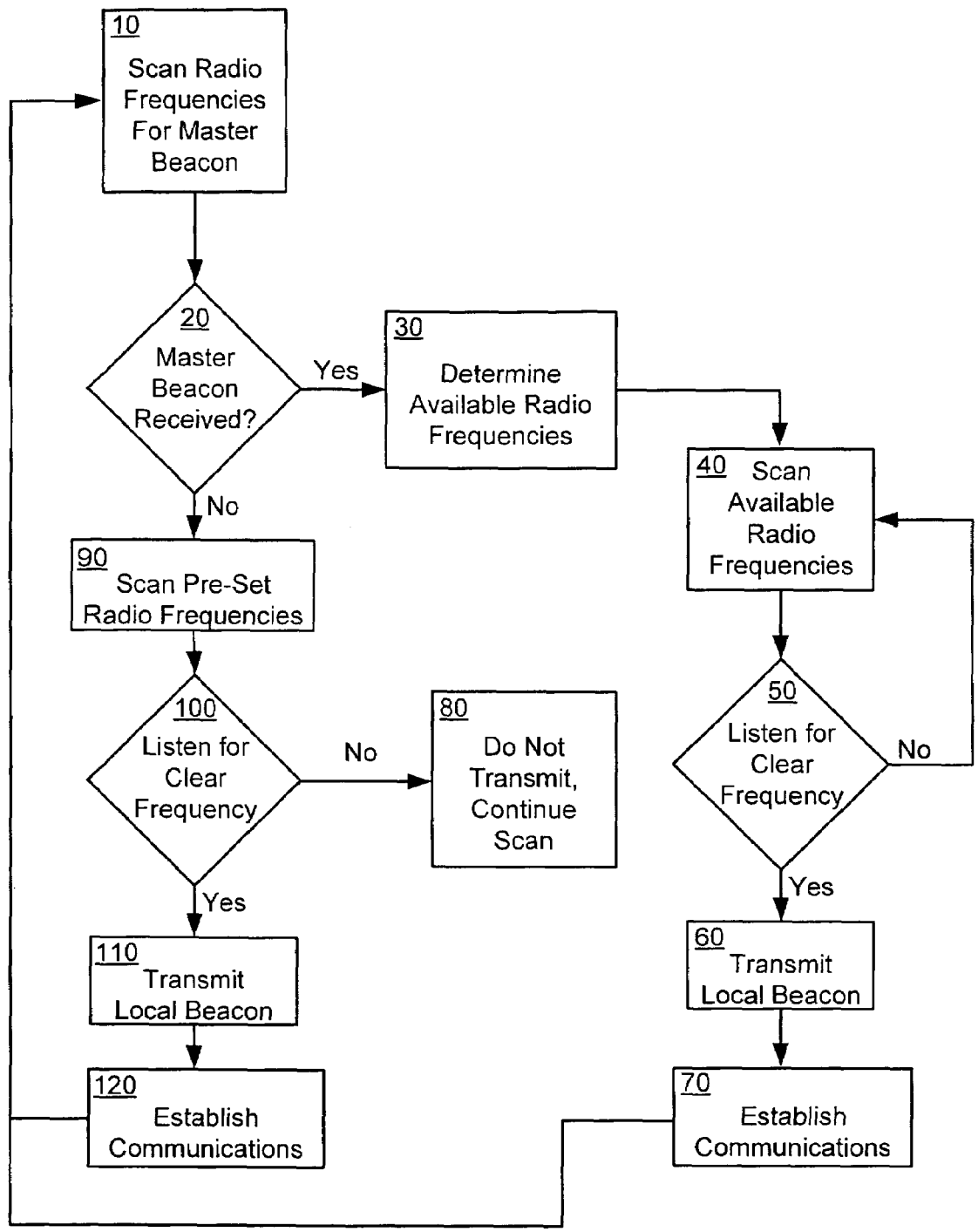
FIG. 4 illustrates a communication method consistent with one embodiment of the present invention.

FIG. 4 illustrates a communication protocol, or method consistent with one embodiment of the present invention. In step 10, a communication device scans and listens to a set of frequency bands for a master beacon. The beacon may be transmitted on any of RF bands discussed above, such as the FM radio bands from approximately 88 to approximately 108 MHz. By way of example and not limitation, the master beacon may alternatively be transmitted within the spectrum occupied by AM radio, broadcast television stations, or cellular service providers. In step 20, if the communication device finds a master beacon signal, it listens to the master beacon to determine which frequency bands may be available for communications, which allows the device to determine which are the available bands (step 30). In step 40, the communication device may then tune to one of the available frequency bands. In step 50, the communication device listens to determine if the channel is in use, or is otherwise occupied. If the channel is occupied, it moves to the next available band. In step 60, once the communication device finds an unoccupied or unused band, it begins to transmit a local beacon signal. In step 70, the communication device may establish communications with other communication devices.

In step 90, if the communication device fails to find a master beacon, the device scans a list of preset frequency bands. In step 100, the communication device listens to each band to determine if the band is presently occupied. If the band is occupied it does not transmit on that band and instead, in step 80, it scans to the next preset band. In step 110, once the communication device has located an available band, it begins to transmit a local beacon, and in step 120, it may establish communications with other communication devices. When communications have been established between multiple communication devices, they may periodically check for a master beacon in the same manner as described above.

The contents of the master beacon may include, but are not limited to: information related to the type of network services offered; a list of frequency bands a communication device has found to be unoccupied; data rates available for high and low data rate communications; and modulation techniques used for high and low data rate communications. In addition, the master beacon may also provide a wide spectrum of additional functional capabilities, such as: a timing channel; a ranging channel; a power conservation function for mobile, or other communication devices with limited power reserve; a dynamic node-to-node power transmit/receive power control function; a network status/health/control status provider; an over-the-air reprogramming link; an over-the-air rekeying link; a "shut-down" function; and a method for routing updates in a mesh network. Each of these functions will be described below:

The master beacon may provide for time precision across wireless networks by functioning as a timing beacon. In a preferred embodiment, different PHYs would be able to access a common beacon. For example, a Bluetooth-enabled device, and a 802.11-enabled device would access a common master beacon channel. This aspect of the present invention would enable the sharing of time information across wireless networks. By sharing time estimations between wireless devices, it becomes possible to generate highly precise time estimates across the network. Higher time accuracy across the network has the potential to provide for increased capacity, especially in Time Division Multiple Access (TDMA) networks by allowing higher time precision TDMA protocols to be utilized.

The master beacon may also provide information about a specific radio frequency band that provides a low-bandwidth communications link for low-bandwidth communication devices. Low bandwidth messaging saves bandwidth for users that need additional bandwidth. For example, a low bandwidth security sensor need not utilize a high-bandwidth communications link to report its status information, thereby saving that high-bandwidth capacity for other applications. This aspect of the master beacon may also provide a power conservation function for communication devices, or other devices with a limited power reserve. By providing information, and subsequent access to a low-bandwidth communication channel, the master beacon may enable power conservation in mobile or power-limited devices. For example, communication devices requiring a low-bandwidth channel would not need to monitor a high-bandwidth channel to acquire or pass low-bandwidth information. In this fashion, a power-limited device is able to improve its power conservation, thereby ensuring longer operation.

The master beacon may also provide an over-the-air reprogramming link. The present invention may pass new communication algorithms, or other programming information to a communication device to enable new functionality. For example, a communication device employing a software definable radio (SDR) may receive a program that allows the communication device to transmit a new waveform. By providing real-time reprogramming, the device's transmission characteristics or capability may be altered, as needed. As regulations change with respect to software definable radios and other cognitive radios, the master beacon may be used to update software and firmware to conform to the new regulations. This over-the-air reprogramming function will allow communication devices to comply with a changing regulatory environment, thereby reducing the cost of redesign and replacement of wireless devices to designers, manufacturers, and consumers alike.

The master beacon may provide an over-the-air re-keying function. That is, the master beacon may provide an encryption key distribution function for secure networks, thereby enabling over-the-air re-keying of encryption devices. This function may provide security in a communications network.

The master beacon may also provide a "shut down" function. Wireless communication devices may not be accepted in all locations for reasons that vary from security concerns to social reasons. For example, wireless communication devices are not yet approved for use on airplanes for safety of flight reasons; they are not approved in hospitals for safety of life reasons; and they are typically not desired in movie theaters for social reasons. The present invention may provide a turn-off function to allow businesses, and others to shut down communication devices when necessary.

This aspect of the master beacon may be employed by police, fire or other priority users. For example, emergency services such as police, fire, etc. may send a priority request on the master beacon instructing all communication devices using a specific frequency to either shut down, or find another available frequency. Alternatively, the emergency services communication device may transmit a signal containing an emergency response message. When a communication device receives a priority request from the master beacon, or receives the emergency response message from the emergency services communication device, it may vacate the channel, or cease transmission, and give the spectrum to the emergency service. In this embodiment the device may negotiate a new channel to move to with other devices prior to vacating the present channel. Alternatively, the communication device may immediately cease transmission. In either case the communication device may continue to listen to the master beacon to determine when the emergency services have vacated the channel. Once this determination is made, the communication device may reestablish communications on an available frequency.

The master beacon may be used in a mesh network for routing updates. One problem in mobile mesh networks is the updating of routing information to nodes that are already saturated with traffic. By providing a separate, out-of-band signaling channel, the master beacon could provide updated routing information to saturated nodes, thereby permitting them to off-load traffic to different nodes. Additionally, traffic bandwidth would not be used to carry common routing information, which would be sent out-of-band, instead of occupying a data, or bit-providing channel.

The master beacon may also assess and manage interference. A communication device receiving the master beacon signal may transmit the amount actual interference seen by the communication device's receiver. The master beacon may then include this information within the beacon signal, thereby communicating information on the local interference conditions. This would allow transceivers to dynamically adjust transmit power based upon the target receiver, thereby ensuring the local interference does not jam, or otherwise degrade the transmission. Additionally, the transmit power may be adjusted in light of the interference to avoid exceeding an emission level.

Figure 5:
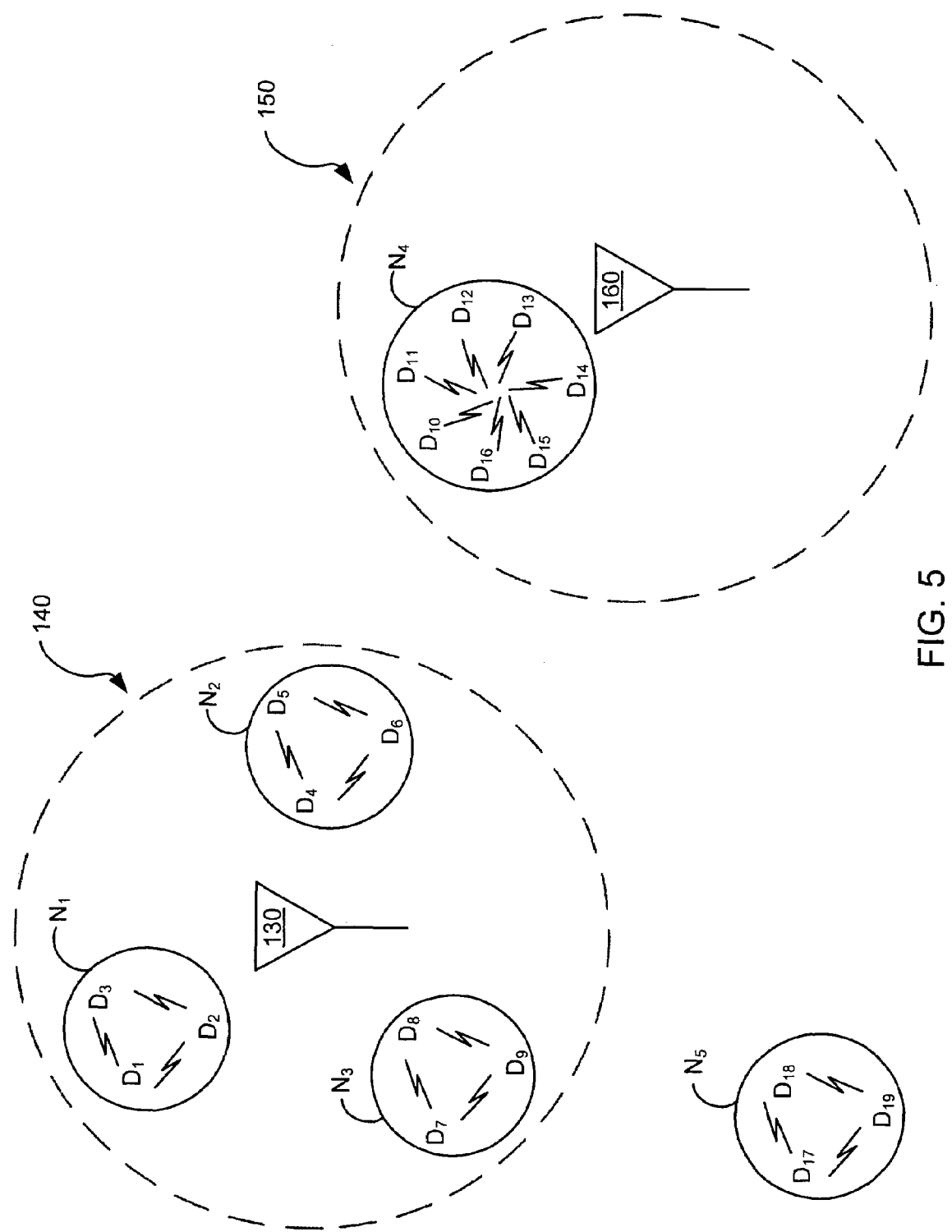
FIG. 5 illustrates a wireless network of transceivers constructed according to the present invention.

FIG. 5 illustrates an environment wherein the communication protocols or methods of the present invention may be used. Beaconing station 130 and 160 transmit a master beacon signal containing some, or all of the above disclosed information to their respective coverage areas 140 and 150. Within each coverage area there may be a number of networks of adaptive communications devices D1 through D16. Network N1, N2, and N3 may be located within the coverage area 140 of beaconing station 130. It is anticipated that the coverage area of the beaconing stations 130 and 160 be larger than the range of adaptive communication devices D1 through D16. But the present invention should not be limited in that respect. When networks N1, N2, and N3 are initialized they listen to beaconing station 130 and select an appropriate frequency in the manner described above. During the course of communications within these networks, the adaptive communication devices continue to monitor the master beacon broadcast by beaconing station 130. Network N4 is responsive to a master beacon transmitted by beaconing station 160 in a like manner as described above. Network N5 is out of range of a fixed beaconing station 130 or 160. Adaptive communication devices D17-19 may establish a network of their own, N5, with one adaptive communication device transmitting a local beacon signal. Each adaptive communication device may still scan for a master beacon. A local beacon may transmit information relating to the available radio frequency bands, and other information.

For example, when a communication device has performed the steps described in connection with FIG. 4, it transmits a local beacon, establishing local network N5. The local beacon includes information on the radio frequency that will be used for establishing local communications, which prevents other communication devices, not included in network N5, to avoid interfering.

The local beacon may provide several functions. One function may be a ranging channel. That is, the local beacon will enable a communication device to function as a wireless positioning beacon. By allowing a communication device to function as a beacon node, positioning applications would become more easily implemented. A second communication device may engage in a two-way ranging process. Two-way ranging enables very accurate ranging, and may provide an indoor E-911 position capability.

The local beacon may also provide dynamic node-to-node power transmit/receive power control. That is, the local beacon may allow wireless links to dynamically control the power transmitted by each end of the link (i.e., each communicating device) to ensure only the minimum transmit power is used to maintain the link. This would be advantageous in applications such as mesh networking to ensure that the local RF environment was kept at the minimum level needed to maintain all the links. Additionally, this functionality of transmit power control allows a wireless device to take advantage of changing regulatory transmit power limits The local beacon may also provide status/health/control information of networks that have been established by local communication devices. Network status, health and control information could be provided over a low-bandwidth channel. For example, updates on node availability in a wireless mesh network could utilize a low-bandwidth, out-of-band channel instead of occupying a high-bandwidth channel.

The communication device, or adaptive communication device D1-19 that may operate using master and local beacons may comprise a cognitive radio. The Institute of Electrical and Electronics Engineers (IEEE) has defined the cognitive radio as "a radio frequency transmitter/receiver that is designed to intelligently detect whether a particular segment of the radio spectrum is currently in use, and to jump into (and out of, as necessary) the temporarily unused spectrum very rapidly, without interfering with the transmissions of other authorized users." The Federal Communications Commission (FCC) has defined Cognitive Radio technologies as those that "make possible more intensive and efficient spectrum use by licensees within their own networks, and by spectrum users sharing spectrum access on a negotiated or an opportunistic basis. These technologies include, among other things, the ability of devices to determine their location, sense spectrum use by neighboring devices, change frequency, adjust output power, and even alter transmission parameters and characteristics."

Figure 6:
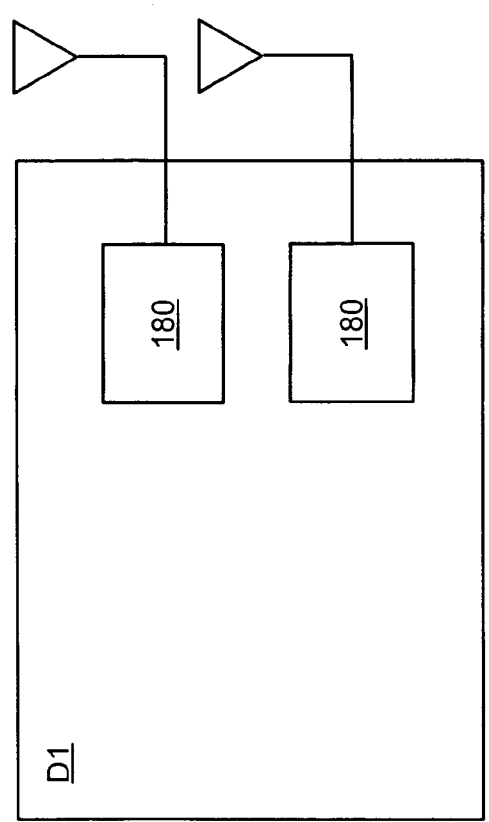
FIG. 6 illustrates an adaptive communication device constructed according to one embodiment of the present invention.
Figure 7:
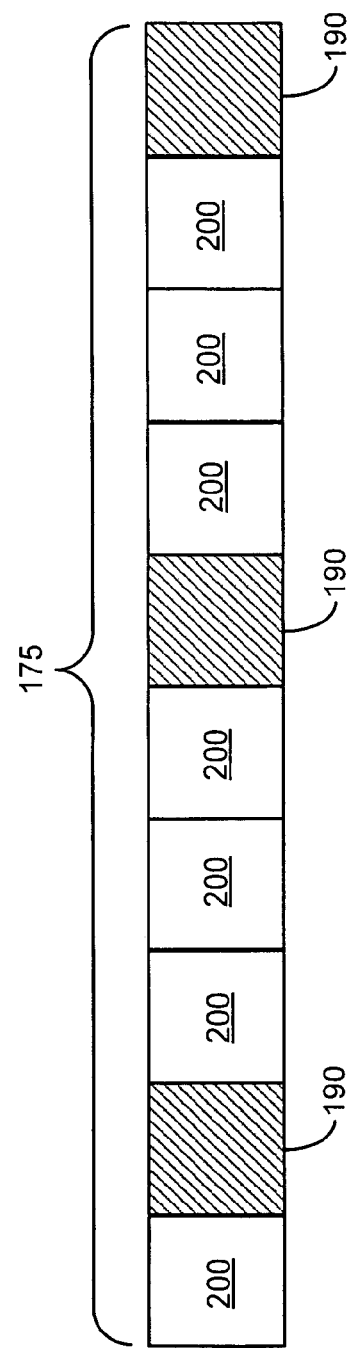
FIG. 7 illustrates a time division multiple access frame construction according to one embodiment of the present invention.

Referring now to FIGS. 6 and 7, one embodiment of an adaptive communication device, which may be any one of devices D1-19 shown in FIG. 5, may employ two receiver circuits 180. For clarity, this section will use D1 to designate the adaptive communication device. The first receiver circuit 180 may monitor a master beacon signal substantially continuously in one radio frequency band f1 while the other receiver circuit 180 is communicating with other adaptive devices in another radio frequency band f2. In another embodiment (not shown), the adaptive device D1 may employ one receiver circuit 180, and employ a time division multiple access (TDMA) frame 175, as shown in FIG. 7, to monitor the master beacon.

Each receiver circuit 180 may include components like one or more band pass filters, and one or more low noise amplifiers (not shown). In this embodiment the band pass filters may be tunable, or adjustable to allow a different frequency band to pass. In this manner the adaptive device D1 may scan, as described above, a number of frequency bands. In one embodiment, one receiver circuit 180 may tune or "listen" to a frequency band where a master beacon has been received, allowing another receiver circuit 180 to receive communications on another frequency band essentially simultaneously. Alternatively, the adaptive device D1 may "listen" or "monitor" the master beacon periodically, devoting the remainder of time to communications in another frequency band.

In another embodiment the adaptive device D1 may only employ a single receiver circuit 180. In this embodiment, the single receiver circuit 180 may be responsive to a frequency band where a master beacon is periodically transmitted. The adaptive device D1 may communicate during the off-time periods of the master beacon, and "listen" to or "monitor" the master beacon when it is present. Alternatively, in this embodiment, the adaptive device D1 may switch frequency bands periodically between a band where communications are conducted and a band where the master beacon is being transmitted. In this manner the adaptive device D1 may monitor the master beacon for updated information. This information may contain a request for bandwidth for emergency services. If such a request is received, the adaptive device D1 may cease transmission on all frequencies and continue to monitor the beacon. Once the emergency services request is no longer present in the beacon, the adaptive device D1 may resume normal communications.

Referring to FIG. 7, the TDMA fame 175 may be constructed to include time slots for monitoring the master beacon 190, and time slots for communication data 200. The master beacon time slots 190 may be on a lower duty cycle than the communication data time slots 200. An adaptive device D1 may additionally contain geographic location technology, such as Global Positioning System (GPS) technology. A geographic location-enabled adaptive device D1 may additionally contain a data base with a list of available frequency bands referenced by geographic location. This type of adaptive device D1 may scan the frequencies reported as available in its geographic location, listening for a "clear" or available channel prior to transmission.

An adaptive communication device D1 constructed according to embodiments of the present invention may employ both a low and a high data rate transceiver. An adaptive communication device D1 may be a phone, a personal digital assistant, a portable computer, a laptop computer, a desktop computer, a mainframe computer, video monitors, computer monitors, or any other device employing adaptive technology. Alternatively, an adaptive communications device D1 may employ scanning technologies that allow it to listen to a plurality of frequencies, either simultaneously or sequentially.

Low data rate transceivers generally use small amounts of energy, with high data rate transceivers generally using significantly more energy. One advantage of the present invention is that an adaptive communication device D1 employing both a low and high data rate transceiver may use the low data rate (LDR) portion for discovery (of the master beacon), control, network log on, and protocol negotiation while the high data rate (HDR) portion is powered down, thus conserving power and extending battery life. For example, the LDR transceiver may signal a local adaptive device or network, and discover its communication capabilities. The LDR transceiver may then synchronize with the local adaptive device/network and provide the synchronization information to the HDR transceiver, which until now, has been in sleep mode, thereby conserving energy.

In one embodiment a low data rate transmitter is used in a handheld adaptive communication device D1 such as a portable tablet computer. This adaptive communication device D1 may receive broadcast television signals and interact with the television service provider over the low data rate transmitter. This "back-channel" to the television broadcast can provide near real-time interactivity for the television or commercial radio provider and the consumer. Alternate embodiments may include a high data rate transmitter for the "back-channel".

Thus, one feature of the present invention is that by providing a common signaling protocol in the form of master and local beacons, an adaptive device D1 may communicate using under-utilized frequency bands. Additionally, the adaptive device D1 may yield to emergency services when the spectrum is needed.

Different adaptive communication devices D1 may include different physical layers ("PHYs"). Another feature of the present invention is that it provides a common communication method, or protocol for communication between devices that employ different physical layers ("PHYs"). Various embodiments of the invention provide features and functions that enable communication between these communication devices. As defined herein, the "physical layer" provides the ability and procedures to activate and use physical components for bit (i.e., data) transmission and reception. Thus, in wireless communications, the major function performed by the PHY are establishment and termination of a connection to a communication medium, such as the air, and conversion between the representation of digital data and the corresponding signals, or pulses, transmitted and/or received over the communication medium. Put simply, one function of the PHY is to change bits into pulses or into a modulated carrier wave. The PHY may be in the form of computer software, hardware or both software and hardware.

In one embodiment of the present invention the PHY may include an ultra-wideband PHY. Other embodiments may not include ultra-wideband PHY technology, and thus, the invention is not limited to only ultra-wideband communication technology.

The Institute of Electrical and Electronics Engineers (IEEE) is currently establishing rules and communication standards for a variety of different networks, and other communication environments that may employ ultra-wideband technology. These different communication standards may result in different rules, or physical-layer air interfaces for each standard. For example, IEEE 802.15.3(a) relates to a standard for ultra-wideband WPANs. Ultra-wideband may also be employed in IEEE 802.15.4 (a standard for sensors and control devices), 802.11n (a standard for Local Area Networks), ground penetrating radar, through-wall imaging, and other networks and environments. Each one of these devices may employ ultra-wideband communication technology, and each device may also have its own communication standard.

An adaptive PHY as used herein within an adaptive communication device D1 may comprise an RF front end capable of communication on a wide range of frequencies. The PHY may scan a number of frequencies to determine if a communication channel is available. The process of scanning may constitute opening the receiver front end to a particular frequency band for a time period. If during that time period a signal is received, the device may attempt to interpret the signal as a master beacon. If the received signal is not a master beacon the device may determine that the channel is not clear and move to the next frequency band.

Generally, access to the PHY is controlled by a Medium Access Control layer (MAC). MACs are most often employed in Local Area Networks (LANs), but may be employed in other types of networks, including ad-hoc networks. In the present invention, the MAC is generally used to keep adaptive devices D1-19 sharing a common communications channel from interfering with each other. The MAC, contained within each adaptive device D1-19, may be in the form of computer software, hardware or both software and hardware. The MAC described herein may be a Master-Slave MAC, where one adaptive device D1 on the network is designated as the master device. The master device coordinates communications between slave devices and between the master and slave devices on the network. In one embodiment, the master device may transmit a local beacon signal. This local beacon signal informs other devices of the network and its availability. Additionally, this local beacon signal may include information on which frequency bands the master device knows to be available or "clear". The master device may additionally monitor the master beacon signal as described above. The master device may additionally decide to move its network to another available frequency band. In this case the local beacon may be used to convey which frequency band the slave devices should move to.

Another aspect of the present invention envisions that part of a communication network N1-5, as shown in FIG. 5, may include a section of wire media. For example, some adaptive devices D10-16 in network N4 may communicate wirelessly over a radio frequency band designated by the master beacon, but one or more of the adaptive devices D10-16 may then transmit information through a wire media. Thus, an adaptive device D10-16 may receive information wirelessly, and then transmit the information through a wire network or vice-versa.

Thus, the present invention may be employed in any type of network, be it wireless or a mix of wire media and wireless components. That is, a network may use both wire media, such as coaxial cable, and wireless devices, such as satellites, or cellular antennas. As defined herein, a network is a group of points or nodes connected by communication paths. The communication paths may use wires or they may be wireless. A network as defined herein can interconnect with other networks and contain sub-networks. A network as defined herein can be characterized in terms of a spatial distance, for example, such as a local area network (LAN), a personal area network (PAN), a metropolitan area network (MAN), a wide area network (WAN), and a wireless personal area network (WPAN), among others. A network as defined herein can also be characterized by the type of data transmission technology used by the network, such as, for example, a Transmission Control Protocol/Internet Protocol (TCP/IP) network, a Systems Network Architecture network, among others. A network as defined herein can also be characterized by whether it carries voice, data, or both kinds of signals. A network as defined herein may also be characterized by users of the network, such as, for example, users of a public switched telephone network (PSTN) or other type of public network, and private networks (such as within a single room or home), among others. A network as defined herein can also be characterized by the usual nature of its connections, for example, a dial-up network, a switched network, a dedicated network, and a non-switched network, among others. A network as defined herein can also be characterized by the types of physical links that it employs, for example, optical fiber, coaxial cable, a mix of both, unshielded twisted pair, and shielded twisted pair, among others.

Thus, it is seen a common signaling method is provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of communication, the method comprising the steps of:
scanning a plurality of radio frequencies for a master beacon signal;
receiving the master beacon signal that includes a list of radio frequencies;
scanning the list of radio frequencies for an unused radio frequency;
transmitting a signal on the unused radio frequency;
transmitting a local beacon signal;
periodically scanning the plurality of radio frequencies for the master beacon signal;
detecting the master beacon signal;
ceasing transmission when a priority signal is included in the master beacon signal;
monitoring the master beacon signal; and
transmitting when the priority signal is absent in the master beacon signal.

2. A method of communication, the method comprising the steps of:
scanning a plurality of radio frequencies for a master beacon signal;
failing to detect the master beacon signal;
scanning the plurality of radio frequencies for an unused radio frequency;
transmitting a signal on the unused radio frequency;
transmitting a local beacon signal;
periodically scanning the plurality of radio frequencies for the master beacon signal;
detecting the master beacon signal;
ceasing transmission when a priority signal is included in the master beacon signal;
monitoring the master beacon signal; and
transmitting when the priority signal is absent in the master beacon signal.

* * * * *